United States Patent

[15] 3,641,825

Reid

[45] Feb. 15, 1972

[54] SPECIFIC GRAVITY URINOMETER

[72] Inventor: Ronald C. Reid, 4205 Enchanted Court, Nashville, Tenn. 37218

[22] Filed: May 15, 1970

[21] Appl. No.: 37,830

[52] U.S. Cl..................................................73/444, 73/441
[51] Int. Cl. .........................................................G01n 9/14
[58] Field of Search ..........................................73/440–450

[56] References Cited

UNITED STATES PATENTS

| 1,611,259 | 12/1926 | Wogenstahl | 73/441 X |
| 2,046,776 | 7/1936 | Edelmann | 73/441 |
| 3,386,289 | 6/1968 | Norcross | 73/441 X |

Primary Examiner—Richard C. Queisser
Assistant Examiner—C. E. Snee, III.
Attorney—A. Yates Dowell and A. Yates Dowell, Jr.

[57] ABSTRACT

Apparatus for measuring the volume and specific gravity of fluids and including inner and outer generally concentric compartments arranged in such a manner that relatively small quantities of fluid can be measured with a high degree of accuracy.

3 Claims, 3 Drawing Figures

PATENTED FEB 15 1972

3,641,825

INVENTOR
RONALD C. REID

BY
ATTORNEYS 3,641,825

SPECIFIC GRAVITY URINOMETER

BACKGROUND OF THE INVENTION

1. Field of the Invention

This invention relates generally to apparatus for measuring and testing materials of different kinds and relates particularly to apparatus for measuring the volume and specific gravity of fluids and is especially useful in accurately determining the physiological status of a person for diagnosing patient disorders.

2. Description of the Prior Art

Heretofore many devices have been provided for measuring and testing materials of different kinds, including the volume and specific gravities of liquids of various kinds. However, these prior art devices have not been entirely satisfactory since they have been bulky, expensive, and difficult to use, and have required a substantial amount of fluid before an accurate reading or measurement could be obtained.

SUMMARY OF THE INVENTION

The present invention is a device for measuring and testing the volume and the specific gravity of fluids such as urine and the like, and is arranged in a manner that very small quantities of fluid can be accurately measured so that the exact volume and specific gravity can be determined. In today's medical practice, the proper diagnosis of patient disorders has been aided by physiological measurements of body fluid such as urine and other body fluids so that preventive and corrective treatments can be given. In certain internal disorders in which a patient may become dehydrated, it is extremely important to accurately measure the amount of fluid discharged from the body so that it can be compared to the amount of fluid intake in order to make an accurate diagnosis of the patient disorder, as well as to show the effect of the medication after it has been administered. In order to do this, it is necessary that exact measurements of the intake and discharge of fluids be recorded, as well as the specific gravity of such fluids. In most prior art devices, a substantial amount of fluid in the range of 75 to 100 milliliters must be present before an accurate reading of the specific gravity can be obtained, whereas in the present invention, less than 10 milliliters can be accurately measured.

In measuring the volume of liquid discharged from the body in the form of urine, such urine normally is discharged into a container which is then removed from the area and poured into a graduated test tube or other container after which the amount of fluid is recorded on the patient's chart. If desired, the present device can be attached to the patient's bed in a position convenient for instant use.

DESCRIPTION OF THE PREFERRED EMBODIMENT

Figure 1:
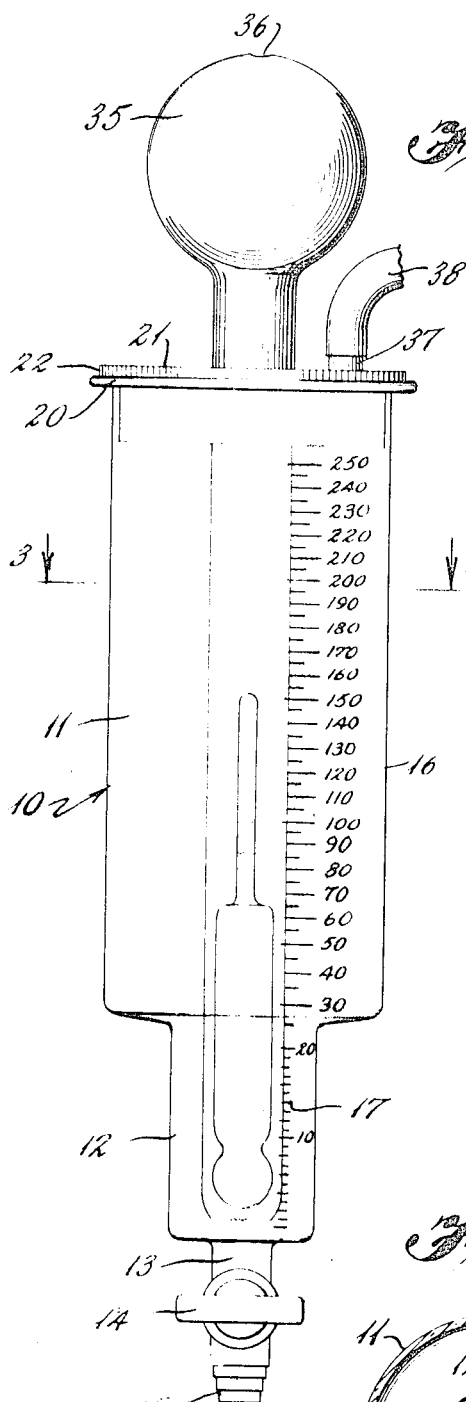
FIG. 1 shows an elevation view of the urinometer of the present invention.

With continued reference to the drawing, the urinometer of the present invention includes a body 10 having a generally cylindrical upper portion 11 of any desired diameter and wall thickness. At its lower end the body is provided with a reduced portion 12 terminating in a neck 13 having a rotary or other type valve 14 therein for regulating the flow of fluid from the body 10. If desired, the end of the neck remote from the reduced portion 12 may have a plurality of reduced rings or steps 15 to facilitate the attachment of a discharge hose (not shown) or the neck 13 could function as a discharge nozzle. Preferably the upper portion 11 is provided with a scale 16 divided into known increments for accurately measuring a volume of fluid which can be introduced into the body. As illustrated the scale 16 is divided into increments of 5 ml. each from 30 to 250 ml. The reduced portion 12 of the body 10 has a scale 17 inscribed thereon marked off in increments of 1 ml. from 0 to 20 ml.

Figure 2:
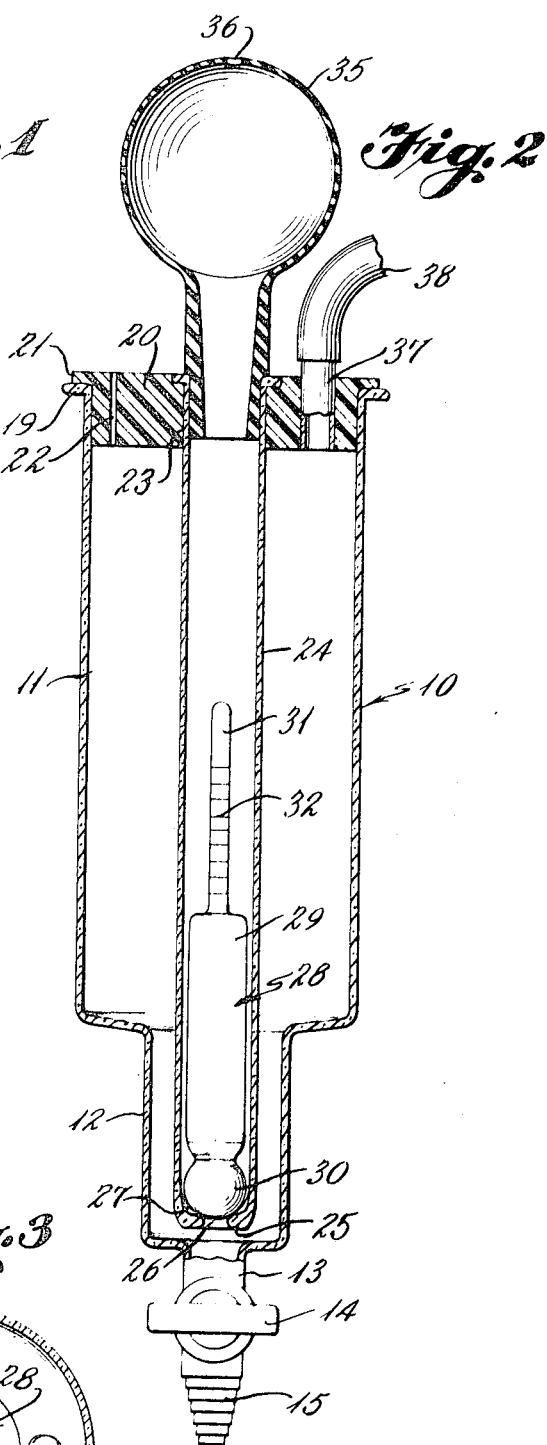
FIG. 2 shows an elevation, partially in longitudinal section, along line 2—2 of FIG. 3.
Figure 3:
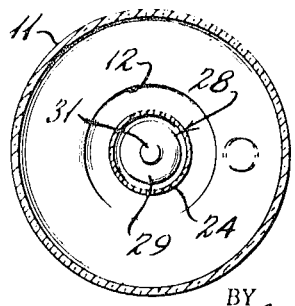
FIG. 3 shows a plan view, partially in section along line 3—3 of FIG. 1.

At the upper end the body 10 is provided with an outwardly extending flange 19 and defines an open top container. A plug 20 constructed of semihard rubber, plastic or other flexible material is provided having an upper flange 21 adapted to engage the flange 19 of the body. As illustrated in FIG. 2, the plug 20 may have one or more openings 22 either through the plug or between the plug and the upper end of the body 10 to provide a venting action and permit the ingress and egress of atmospheric air. The plug 20 has an opening 23 disposed generally axially of the body 10 and such opening is adapted to receive an elongated tubular member 24 which extends through the upper portion 11 and substantially through the reduced portion 12 of the body 10. The elongated member 24 is disposed generally concentrically of the body 10. Such member is of a predetermined outer diameter and wall thickness so that the volume of fluid contained within the reduced portion 12 will accurately register on the scale 17.

As illustrated in FIG. 2, the lower end of the elongated member 24 is provided with an inwardly turned flange 25 defining a central opening 26. The inwardly turned flange 25 is provided with a plurality of generally radial ridges or supports 27 for a purpose which will be described later. A hydrometer 28 is located within the tubular member 24 and such hydrometer includes a generally cylindrical body 29 having a substantially semispherical head 30 at one end, and a tail or reduced extension 31 at the opposite end. The tail 31 is provided with a scale 32 divided into increments of known specific gravities ranging from a minimum urine concentration of 1.000 specific gravity at a position remote from the body 29, to a maximum urine concentration of 1.045 specific gravity at the position adjacent to the body 29.

At the upper end of the elongated tubular member 24 a hollow bulb 35 of rubber or other flexible material is connected and such bulb is provided with a vent 36 of any desired character. As illustrated, the vent is merely an opening which can be selectively closed by a finger of the user; however, if desired a mechanically operated vent valve could be used.

In order to introduce urine or other fluid into the body 10, the plug 20 has a short nipple 37 extending through the same with the upper portion extending outwardly of the plug. A supply hose 38 is connected to the upper portion of the nipple through which fluid is introduced into the body 10.

In the operation of the device urine or other fluid to be measured is introduced into the body 10 through the supply hose 38. Within the body the fluid will flow to the reduced portion 12 and after the reduced portion has been filled the level of fluid will rise within the upper portion 11. If 20 milliliters or less of liquid is introduced into the body, all of such liquid will be confined within the reduced portion 12. When the flow of liquid into the body has ceased, an accurate reading of the volume of liquid can be ascertained by the scales 16 and 17 and if desired such volume can be recorded on a chart. After the volume has been recorded, the bulb 35 is squeezed, the vent or valve 36 is occluded, and the bulb is released. Expansion of the bulb will create a negative pressure within the elongated tubular member 24 to draw the liquid from the reduced portion 12 into the tubular member through the opening 26 until the hydrometer 28 floats and registers the specific gravity on the scale 32. If the fluid being tested has maximum urine concentration and a specific gravity of 1.045, then 5 milliliters only are required to cause the hydrometer to float. If the fluid being tested has a minimum urine concentration of 1.000 specific gravity, then 8 milliliters will be required to float the hydrometer. When larger quantities of fluid are introduced into the body 10, the hydrometer 28 will float automatically when from 50 to 115 milliliters have been introduced depending upon the specific gravity of the liquid.

After the specific gravity of the liquid has been tested, the vent 36 is opened to permit liquid within the tubular member 24 to return to the body 10 so that the liquid level within the body 10 is substantially equal to the liquid level within the tubular member 24. Thereafter the valve 14 is opened so that the liquid can drain from the body. During the draining of the liquid, the head 30 of the hydrometer will rest on the ridges 27 in a manner that the liquid within the tubular member 24 can pass beneath the hydrometer. When the liquid has been drained from the body, the valve 14 is closed and the body is in condition to receive the next charge of liquid.

I claim:

1. A specific gravity urinometer for measuring the volume and specific gravity of fluids comprising an elongated hollow body having a reduced portion at one end, fluid discharge means connected to said reduced portion, selectively operable valve means located within said discharge means for controlling the discharge of the fluid, an elongated tubular member located within said body and extending substantially the full length thereof, hydrometer means freely movably carried within said elongated member, means for retaining said hydrometer means within said member, said hydrometer means having a scale for measuring the specific gravity of fluid, a flexible bulb mounted on one end of said elongated member, said bulb having vent means, and means for introducing fluid into said body, whereby when the bulb is collapsed air is occluded from said bulb after which the vent means is closed so that when the bulb expands a negative pressure will be created within said elongated member to draw fluid into said member by atmospheric pressure to permit the hydrometer to float and measure the specific gravity of the liquid.

2. The structure of claim 1 including a first scale associated with said body and a second scale associated with said reduced portion.

3. The structure of claim 1 including plug means for closing one end of said body and supporting said elongated member.

* * * * *